United States Patent
Merrill et al.

(10) Patent No.: US 8,475,621 B2
(45) Date of Patent: Jul. 2, 2013

(54) ADHESION PROMOTION TO DIFFICULT SUBSTRATES FOR HOT MELT ADHESIVES

(75) Inventors: Natalie A. Merrill, Somerville, NJ (US); Thomas Quinn, St. Paul, MN (US); Michael Jablon, Ramsey, NJ (US)

(73) Assignee: Honeywell International Inc., Morristown, NJ (US)

( * ) Notice: Subject to any disclaimer, the term of this patent is extended or adjusted under 35 U.S.C. 154(b) by 801 days.

(21) Appl. No.: 11/789,306

(22) Filed: Apr. 24, 2007

(65) Prior Publication Data

US 2008/0264562 A1    Oct. 30, 2008

(51) Int. Cl.
| | |
|---|---|
| *C04B 37/00* | (2006.01) |
| *B32B 27/00* | (2006.01) |
| *B01F 17/00* | (2006.01) |
| *C08L 23/00* | (2006.01) |
| *C08L 23/04* | (2006.01) |

(52) U.S. Cl.
USPC ............ 156/325; 156/334; 524/528; 525/240

(58) Field of Classification Search
USPC ................... 156/325, 334; 524/528; 525/240
See application file for complete search history.

(56) References Cited

U.S. PATENT DOCUMENTS

| | | |
|---|---|---|
| 6,107,430 A | 8/2000 | Dubois et al. |
| 6,833,404 B2 | 12/2004 | Quinn et al. ................. 524/487 |
| 7,199,180 B1 | 4/2007 | Simmons et al. |
| 2003/0139516 A1* | 7/2003 | Quinn et al. ................. 524/487 |
| 2004/0029980 A1* | 2/2004 | Stumphauzer et al. ......... 516/31 |
| 2005/0154095 A1* | 7/2005 | Heath et al. ..................... 524/35 |
| 2006/0074171 A1 | 4/2006 | Bach et al. ..................... 524/487 |

FOREIGN PATENT DOCUMENTS

| | | |
|---|---|---|
| WO | WO 98/03603 | 1/1998 |
| WO | 2005/049754 A1 | 6/2005 |

OTHER PUBLICATIONS

Marti-Ferrer, F. et al, Flour Rice Husk as Filler in Block Copolymer Polypropylene: Effect on Different Coupling Agents J. of Applied Polymer Science, vol. 99, pp. 1823-1831 (2006).
TCI America website: <http://www.tcichemicals.com/eshop/en/us/category_index/00151/> (Printout describing various siliane coupling agents) (printed May 23, 2012).

\* cited by examiner

*Primary Examiner* — Michael Orlando
(74) *Attorney, Agent, or Firm* — Carrie Beatus

(57) ABSTRACT

Hot melt adhesive compositions which have enhanced adhesion to difficult substrates, particularly at refrigerator/freezer temperatures or at elevated temperatures. The inventive compositions require a base polymer comprising at least one metallocene ethylene-containing polymer or at least one non-metallocene, amorphous, propylene containing polymer; a tackifier; an optional wax; and an adhesion promoting additive comprising at least one semi-crystalline polymer having a weight average molecular weight of about 30,000 daltons or less. It has been found that the adhesion promoting additive of this invention enhances the adhesion properties of a hot melt adhesive composition having a metallocene ethylene-containing base polymer or non-metallocene, amorphous, propylene containing base polymer, particularly at elevated temperatures or at low refrigerator and freezer temperatures where other conventional adhesives have been unsuccessful.

22 Claims, No Drawings

000
ADHESION PROMOTION TO DIFFICULT SUBSTRATES FOR HOT MELT ADHESIVES

BACKGROUND OF THE INVENTION

1. Field of the Invention

The present invention relates to hot melt adhesive compositions. More particularly, the invention relates to hot melt adhesives which exhibit improved adhesion to difficult substrates, particularly at very low or very high temperatures.

2. Description of the Related Art

Hot-melt adhesives are thermoplastic materials which are typically solid at room temperature, and are denoted by the abbreviation HMA (hot-melt adhesives). Hot melt adhesives are widely used in industry for various applications such as product assembly, packaging, hygiene and elastic attachment, lamination, case and carton sealing, bookbinding and applications in the construction bonding, furniture, and textile industries, profile wrapping, and the like.

Various HMA's have different weaknesses relating to adhesion to certain substrates and adhesion at different temperatures. For instance, hot melt adhesives based on metallocene ethylene octene copolymers, or "mEO" adhesives, which are advantageous for their low odor, high clarity, and ease of use, often exhibit poor adhesion to difficult substrates, particularly at low temperatures such as refrigerator or freezer temperatures. This can be a problem in applications relating to corrugated and/or coated carton stock for food packaging and the like. Conversely, hot melt adhesives based on amorphous poly-alpha-olefins, known as "APAO" adhesives, often suffer from poor adhesion to difficult substrates, particularly at elevated temperatures, as well as difficulty in viscosity control while maintaining adhesive and cohesive properties required for performance. This can be a problem with applications such as film laminating, woodworking, profile wrapping, PVC edge banding, and other adhesion applications with wood, steel, and wrapping films.

It is highly undesirable for materials to lose adhesion due to an adhesive that either lacks cold temperature resistance and becomes brittle, or lacks high temperature resistance and softens. However, in achieving high temperature resistance, cold temperature resistance is often sacrificed, and vice versa. In addition, an increase in adhesion may result in a decrease in cohesion between component parts of a composition. It would therefore be desirable to formulate a hot melt adhesive composition having improved cohesion properties in addition to improved adhesion performance to difficult substrates, particularly at elevated or low temperatures. Such compositions would exhibit improved adhesion to difficult substrates at elevated and/or low temperatures, as compared to conventional hot melt adhesives. Further, certain compositions would exhibit an increase in both cohesion and adhesion when considering both shear adhesion failure temperature (SAFT) and peel adhesion failure temperature (PAFT).

SUMMARY OF THE INVENTION

The invention provides a hot melt adhesive composition which comprises:
a) a base polymer comprising at least one metallocene ethylene-containing polymer or at least one non-metallocene, amorphous, propylene containing polymer;
b) a tackifier;
c) an optional wax; and
d) an adhesion promoting additive comprising at least one semi-crystalline polymer having a weight average molecular weight of about 30,000 daltons or less.

The invention also provides a process for forming a hot melt adhesive composition which comprises combining:
a) a base polymer comprising at least one metallocene ethylene-containing polymer or at least one non-metallocene, amorphous, propylene containing polymer;
b) a tackifier;
c) an optional wax; and
d) an adhesion promoting additive comprising at least one semi-crystalline polymer having a weight average molecular weight of about 30,000 daltons or less.

The invention further provides a process for forming an adhesive substrate which comprises:
I) forming a hot melt adhesive composition by combining:
  a) a base polymer comprising at least one metallocene ethylene-containing polymer or at least one non-metallocene, amorphous, propylene containing polymer;
  b) a tackifier;
  c) an optional wax; and
  d) an adhesion promoting additive comprising at least one semi-crystalline polymer having a weight average molecular weight of about 30,000 daltons or less;
II) heating the hot melt adhesive composition to a temperature at or above the melting point of the hot melt adhesive composition; and
III) applying the heated hot melt adhesive composition to a substrate.

The invention still further provides a process for adhering an article to an adhesive substrate which comprises:
I) forming a hot melt adhesive composition by combining:
  a) a base polymer comprising at least one metallocene ethylene-containing polymer or at least one non-metallocene, amorphous, propylene containing polymer;
  b) a tackifier;
  c) an optional wax; and
  d) an adhesion promoting additive comprising at least one semi-crystalline polymer having a weight average molecular weight of about 30,000 amu or less;
II) heating the hot melt adhesive composition to a temperature at or above the melting point of the hot melt adhesive composition;
III) applying the heated hot melt adhesive composition to a substrate, to thereby form an adhesive substrate; and
IV) contacting the adhesive substrate with an article, such that the article adheres to the adhesive substrate via the hot melt adhesive composition.

DETAILED DESCRIPTION OF THE INVENTION

The present invention provides hot melt adhesive compositions which exhibit improved adhesion to difficult substrates, particularly at low or high temperatures. Temperatures considered "low" are those temperatures at which foods are refrigerated or frozen. Refrigerator temperatures typically range from about 33° F. (0.56° C.) to about 40° F. (4.4° C.). Freezer temperatures typically range from about 32° C. (0° C.) and below. Particularly low temperatures are those at which frozen foods are stored, for instance about −4° F. (−20° C.). Temperatures considered "high" are those at temperatures above the DOT (Department of Transportation) temperature test requirement for adhesives, which is about 60° C. Temperatures above this, and particularly those at about 65° C. or higher, would be considered "high" for adhesives. The term "difficult substrate" is herein defined as those substrates which typically exhibit poor adhesion to hot melt adhesives, or which exhibit poor adhesion to other substrates or articles via such hot melt adhesives. Examples of difficult substrates at low temperatures include food packaging materials such as acrylic coated paperboard. Examples of difficult substrates at high temperatures include vinyl and wood.

The invention provides a hot melt adhesive composition which comprises:

a) a base polymer comprising at least one metallocene ethylene-containing polymer or at least one non-metallocene, amorphous, propylene containing polymer; b) a tackifier; c) an optional wax; and d) an adhesion promoting additive comprising at least one semi-crystalline polymer having a weight average molecular weight of about 30,000 daltons or less.

The base polymer is defined herein as being the polymer component of the highest molecular weight in the overall hot melt adhesive composition. The base polymer according to this invention comprises at least one metallocene ethylene-containing polymer, or at least one non-metallocene, amorphous, propylene containing polymer. As used herein, the term "polymer" is meant to include homopolymers, copolymers, terpolymers, interpolymers, or combinations thereof. The base polymer component is preferably present in the hot melt adhesive composition in an amount ranging from about 5% by weight to about 95% by weight, more preferably from about 20% by weight to about 80% by weight, and most preferably from about 40% to about 75% by weight of the overall composition.

The metallocene ethylene-containing polymer is defined for purposes of this invention as a base polymer which comprises ethylene polymerized by a catalyst. The catalyst may be referred to as a metallocene, single site, constrained geometry, or "post-metallocene" catalyst. Examples of suitable metallocene ethylene-containing polymers nonexclusively include: metallocene ethylene-octene copolymers, metallocene ethylene-hexene copolymers, ethylene-butene, and terpolymers which comprise a mixture of alpha-olefin or cyclic comonomers. In one preferred embodiment, the metallocene ethylene-containing polymer comprises a metallocene ethylene-hexene copolymer. In another preferred embodiment, the metallocene ethylene-containing polymer comprises a metallocene ethylene-octene copolymer.

As mentioned previously, hot melt adhesives which are based on metallocene ethylene-octene copolymers are known in the art as "mEO" adhesives. These adhesives are advantageous for their low odor, high clarity, and ease of use. However, they have been known to exhibit poor adhesion to difficult substrates, such as acrylic coated paperboard, particularly at low temperatures such as refrigerator or freezer temperatures. It has now been unexpectedly found that mEO adhesive compositions which are formed according to the present invention exhibit improved adhesion to difficult substrates at low temperatures, particularly due to the adhesion promoting additive. The unexpected findings of improved adhesion, in terms of percent fiber tear of the substrate, are shown in the data of Table 2, below, as well as in Examples 12-24. An increase in percent fiber tear of 50% or more is considered a significant improvement. The data shows that the inventive hot melt adhesives of Examples 13-24 all exhibited increases in percent fiber tear versus the "control" adhesive of Example 12 at 0° C. Significant increases of 50% or greater were shown in eleven out of twelve of these trials at 0° C. for corrugated board stock, and at 35° C. for coated carton stock in the form of a bacon carton. These results were unexpected because the control adhesive is exemplary of conventionally known and used hot melt adhesives, which have presumably been optimized over time by those skilled in the art. Commercially available metallocene ethylene-octene copolymers useful for this invention nonexclusively include Affinity™ GA-1950 and Affinity™ GA-1900, available from Dow Global Technologies Inc., of Midland, Mich.

The metallocene ethylene-containing polymer preferably has a specific gravity of about 0.90 or below, and more preferably from about 0.88 or below. The specific gravity may be determined using ASTM procedure D1238-04c, "Standard Test Method for Melt Flow Rates of Thermoplastics by Extrusion Plastometer."

The metallocene ethylene-containing polymer preferably has a melt index of from about 5 to about 3000, more preferably from about 200 to about 2000, and most preferably from about 400 to about 1200. In one specific embodiment, a preferred metallocene ethylene-containing polymer has a melt index of about 500. In another specific embodiment, a preferred metallocene ethylene-containing polymer has a melt index of about 1000.

In a specific embodiment of the invention, the metallocene ethylene-containing polymer comprises a metallocene polyethylene copolymer, which is defined herein as including at least one linear or substantially linear interpolymer of ethylene and at least one $C_3$-$C_{20}$ alpha olefin comonomer, prepared with a metallocene catalyst, or constrained geometry as described above. The interpolymer preferably has a polydispersity of about 2.5 or less, and a density of from about 0.850 g/cm$^3$ to about 0.886 g/cm$^3$. Polydispersity is defined herein as the ratio of the weight-average molecular weight to the number average molecular weight, or Mw/Mn. Polydispersity is an indicator of molecular weight variation. A lower polydispersity corresponds to a narrow molecular weight range, which is indicative of improved performance, especially over a range of temperatures.

Regarding the non-metallocene, amorphous, propylene containing polymer, suitable examples nonexclusively include: amorphous poly-alpha-olefins, propylene alpha-olefin interpolymers, propylene-butene copolymers, and amorphous terpolymers of ethylene, propylene and 1-butene monomers. In a preferred embodiment, the non-metallocene, amorphous, propylene containing polymer comprises an amorphous poly-alpha-olefin or "APAO." Examples of suitable commercially available APAO polymer materials include Huntsman's REXtac® materials and Degussa's Vestoplast® materials, as well as the Eastman Eastoflex® materials. Typical molecular weight ranges for these APAO base polymers usually range from about 30,000 to about 110,000 or more.

APAO adhesives are often used in film laminating, woodworking profile wrapping, wood edgebanding, and other adhesion applications with wood, steel, and wrapping films. Conventional APAO adhesives typically exhibit poor peel adhesion to these substrates, particularly at high temperatures such as those discussed above, and the viscosity of APAO formulations has been difficult to control while maintaining both adhesive and cohesive properties. A well known trade-off in the formation of hot melt adhesives is that cohesion tends to suffer as viscosity is reduced. It has now been unexpectedly found that APAO adhesives formed according to the present invention exhibit improved adhesion to these substrates, even at elevated temperatures. These unexpected findings, in terms of PAFT, SAFT, and polypropylene (PP) lap shear, are shown in the data of Table 1 below, as well as in Examples 1-11. An increase in PAFT of 50° F. (10° C.) or greater, or an increase in SAFT of 25° F. or greater is considered a significant improvement. An increase in polypropylene (PP) lap shear of 50 psi or greater is considered a significant improvement. The data shows that the inventive hot melt adhesives of Examples 2-11 each exhibited increases in PP lap shear versus the "control" adhesive of Example 1. In nine out of ten of these trials, significant improvements in lap shear were shown. The data also shows that each of Examples 2-11 exhibited increases in PAFT, with seven out of ten of these trials showing significant improvements. Furthermore, nine out of ten of these trails also exhibited increases in SAFT, with six out of ten of these trials showing significant improvements. These results were unexpected because the control adhesive is exemplary of conventionally known and used hot melt adhesives, which have presumably been optimized over time by those skilled in the art. Commercially available non-metallocene, amorphous, propylene containing polymers useful for this invention nonexclusively include Vestoplast® 828, available from Degussa Corporation of Parsippany, N.J.

The present inventive compositions further comprise a tackifier. The tackifier gives tack to the adhesive, and may also lower viscosity. Lower viscosity improves application flow characteristics, allowing for easier processing, lower energy requirements, and lower processing temperatures. Lower viscosity also helps the adhesive to "wet out," or to substantially uniformly coat the surface and penetrate the substrate. Tack is required in most adhesive formulations to allow for proper joining of articles prior to solidification of the hot melt adhesive. Any conventionally known tackifier, which is suitable for use in formulating hot melt adhesives, may be used in the present practice of the invention. Examples of suitable tackifiers nonexclusively include glycerol and pentaerythritol esters of natural and chemically modified rosins; naturally occurring and chemically modified resins, such as wood rosin, gum rosin, tall oil rosin, distilled rosin, and rosins modified by processes such as polymerization, hydrogenation, esterification and dimerization; thermal oligomerization and aromatic modification; polyterpene resins; modified terpene resins, such as chlorinated terphenyl resins and phenolic-modified terpene resins; aliphatic petroleum hydrocarbon resins, such as those resulting from polymerization of olefin and diolefin monomers, cyclopentadiene or dicyclopentadiene, piperylene, oligomers of the same, or combinations thereof. A preferred tackifier comprises an aromatic modified cycloaliphatic hydrocarbon resin. Commercially available tackifiers which are suitable for this invention nonexclusively include Escorez® 5637 and Escorez® 2596, available from Exxon Mobil Corporation of Irving, Tex.

The tackifier is preferably present in the inventive hot melt adhesive composition in an amount ranging from about 2% by weight to about 75% by weight, more preferably from about 15% by weight to about 70% by weight, and most preferably from about 20% to about 40% by weight of the overall composition.

The inventive compositions may optionally further comprise a wax. Waxes serve to reduce the overall viscosity of the adhesive, thereby allowing it to liquefy and allowing for the proper application or coating of the hot melt adhesive onto an intended substrate. The type and melting point of a wax controls the open time and setting speed of the adhesive. Open time is known in the art as being the amount of time for an adhesive to wet out and bond to a substrate after application. Any conventionally known wax, which is suitable for use in formulating hot melt adhesives, may be used in the practice of the invention. Examples of suitable waxes nonexclusively include polar waxes, paraffin waxes, polyolefin waxes, Fischer-Tropsch waxes, petroleum waxes, synthetic waxes, vegetable waxes, microcrystalline waxes, ethylene vinyl acetate waxes, polyethylene waxes, slack wax, byproduct or degraded waxes derived from polymerization or refinery processes, oxidized waxes, ethylene acrylic acid copolymer waxes, or combinations thereof. One commercially available wax that is suitable for this invention is Sasol® H-I, available from Sasol Wax Americas, Inc. of Shelton, Conn.

In one preferred embodiment, where the base polymer comprises at least one metallocene ethylene-containing polymer, the optional wax is present. In other preferred embodiment, where the base polymer comprises at least one non-metallocene amorphous propylene containing polymer, the optional wax is not present. The wax, if present in the inventive hot melt adhesive composition, is preferably present in an amount ranging from about 4% by weight to about 85% by weight, more preferably from about 10% by weight to about 60% by weight, and most preferably from about 15% to about 35% by weight of the overall composition.

Another component of the present hot melt adhesive compositions is the adhesion promoting additive. The adhesion promoting additive comprises at least one semi-crystalline polymer having a weight average molecular weight of about 30,000 daltons or less, preferably from about 8,000 daltons to about 25,000 daltons, and more preferably from about 12,000 daltons to about 22,000 daltons. Using semi-crystalline polymers having a weight average molecular weight of about 30,000 daltons or less enhances the adhesion promoting additive's compatibility with the higher molecular weight base polymer. Examples of suitable semi-crystalline polymers for the adhesion promoting additive nonexclusively include: propylene-containing polymers, maleated propylene-containing polymers, maleated ethylene-containing polymers, or combinations thereof. Specific examples include maleated propylene-ethylene copolymer, maleated ethylene copolymers propylene-ethylene copolymer, and propylene homopolymer. A preferred semi-crystalline polymer for this invention comprises maleated propylene-ethylene copolymer. Commercially available adhesion promoting additives useful for this invention nonexclusively include certain Honeywell A-C® additives, such as A-C® 925, A-C® 573, A-C® 575, A-C® 596, A-C® 597, A-C® 1325, and A-C® 1089, A-C® 1660 and A-C® 1172 additives, which are available from Honeywell International Inc., of Morristown, N.J.

In a preferred embodiment, the adhesion promoting additive comprises a semi-crystalline polymer, as described above, which comprises a maleated polymer having a percent bound of about 50% or greater. The term "percent bound" (i.e. percent grafted) is defined herein as the weight ratio of bound maleic anhydride to the total maleic anhydride of a maleated polymer. The total maleic anhydride includes both bound and unbound maleic anhydride. The term "bound maleic anhydride" is defined as the maleic anhydride which has reacted with the polymer chain, and is thus bound or grafted thereto. The term "unbound maleic anhydride" describes both unreacted maleic anhydride and unbound maleic anhydride-containing oligomers. Maleated polymers having a percent bound of 50% or greater nonexclusively include: A-C® 925, A-C® 1325, A-C® 596 and A-C® 597, available from Honeywell International, Inc. of Morristown, N.J.

In a preferred embodiment, the adhesion promoting additive comprises a semi-crystalline polymer, as described above, which has a Mettler drop point of from about 100° C. to about 170° C. Mettler drop point is determined by a Mettler drop point apparatus, which is well-known in the art. The Mettler drop point is the point where a molten polymeric material "drops" past an electric eye, and is recorded in terms of the temperature of the dropping point, generally in degrees Celsius or Fahrenheit. Mettler drop point of the adhesion promoting additive is a function of its crystallinity, which contributes to the heat resistance, process temperature, and application performance of the final adhesive. In a further embodiment, an ethylene-based adhesion promoting additive has a viscosity, based on Brookfield viscometer measurement at 140° C., of from about 100 cps to about 5000 cps. In another embodiment, a adhesion promoting additive comprising propylene has a viscosity, based on Brookfield viscometer measurement at 190° C., of from about 100 cps to about 5000 cps, due to the melting point of propylene. The viscosity may be determined using ASTM procedure D3236.

The adhesion promoting additive is preferably present in the hot melt adhesive composition in an amount of from about 1% to about 25% by weight of the composition, more preferably from about 3% to about 19% by weight of the composition, and most preferably from about 7% to about 14% by weight of the composition.

It has been unexpectedly found that the adhesion promoting additive of this invention enhances the adhesion properties of a hot melt adhesive composition having a metallocene ethylene-containing base polymer at low temperatures, such as refrigerator and freezer temperatures, where other conventional adhesives have suffered. Comparative Example 12 shows the low adhesion results, based on the percent of substrate fiber tear, for a conventional mEO adhesive which does not contain the additive of the present invention. Based on the results of Comparative Example 12, the benefits resulting from a combination of the adhesion promoting additives of the present invention with a metallocene ethylene-containing base polymer was surprising and unexpected as shown in Examples 13-24 which show increases in percent of substrate fiber tear with the addition of the inventive adhesion promoting additive.

It has also been unexpectedly found that the adhesion promoting additive of this invention enhances the adhesion properties of a hot melt adhesive composition having a non-metallocene, amorphous, propylene containing base polymer, particularly at elevated temperatures such as those above 60° C. as stated above, where other conventional adhesives have suffered. Comparative Example 1 shows the low PAFT, SAFT, and polypropylene (PP) lap shear strength results from a conventional APAO adhesive which does not contain the additive of the present invention. Based on the results of Comparative Example 1, the benefits resulting from a combination of the adhesion promoting additives of the present invention with an amorphous, propylene containing base polymers was surprising and unexpected, as shown in Examples 2-11 which show increases in PAFT and SAFT with the addition of the inventive adhesion promoting additive.

The present results were further unexpected based on Comparative Examples 25-37 showing either poor results or no significant improvements in adhesion of a hot melt adhesive formed with an ethylene vinyl acetate (EVA) base polymer, based on percent of substrate fiber tear, even though this EVA adhesive included the adhesion promoting additive of the present invention. Specifically, for instance, Comparative Example 25 shows a 0% adhesion (fiber tear) to a bacon carton at 35° F. (1.7° C.). With the addition of the inventive adhesion promoting additive in Examples 26-37, each of these trials still exhibit 0% adhesion (fiber tear) to a bacon carton at 35° F. (1.7° C.). Thus, improved adhesion properties were only shown in hot melt adhesive compositions which contained the selected adhesion promoting additives of the present invention, in combination with the selected base polymers of the present invention.

The inventive hot melt adhesive compositions may further comprise other additives such as stabilizers, plasticizers, antioxidants, fillers, colorants, diluents such as oils, talcs such as silica, minerals such as clays, or other additives deemed suitable by those skilled in the art, and combinations thereof. These may include functional additives which may add a specific physical or chemical property that impacts the characteristics of the adhesive in manufacturing or use, and not necessarily related to the adhesion character of the adhesive. In formulating adhesives, all of the ingredients should be compatible, so the formulation does not separate when heated or melted. Separation would result in the inability to apply the adhesive, as well as poor adhesive performance.

The hot melt adhesive compositions of the present invention are particularly useful in packaging applications and in the formation of packaging materials, such as food packaging materials. The hot melt adhesive compositions are also particularly useful in applications such as film laminating, woodworking profile wrapping, wood edge banding, and other adhesion applications with wood, steel, and wrapping films.

The invention further provides a process for forming the inventive hot melt adhesive compositions. The process comprises combining the above-described components of the inventive hot melt adhesive compositions, namely: a) a base polymer comprising at least one metallocene ethylene-containing polymer or at least one non-metallocene, amorphous, propylene containing polymer; b) a tackifier; c) an optional wax; and d) an adhesion promoting additive comprising at least one semi-crystalline polymer having a weight average molecular weight of about 30,000 daltons or less.

The combining of these components may be done using any suitable conventional method such as mixing, extrusion, and the like. In one embodiment, the combining step comprises forming a substantially homogeneous admixture of components (a)-(d). In another embodiment, the combining comprises extruding components (a)-(d). Any conventional extrusion method may be used, such as melt extrusion, coextrusion, solid extrusion, master batching, melt blending, batch mixing, and the like.

The invention further provides a process for forming an adhesive substrate. In this process, a hot melt adhesive composition is formed as described above. That is, components (a)-(d) are combined. The resulting hot melt adhesive composition is then heated to a temperature at or above the melting point of the overall hot melt adhesive composition. This heated hot melt adhesive composition is then applied to a substrate, using any suitable conventional technique, to thereby form an adhesive substrate. In certain embodiments, this process further comprises the subsequent step of bringing the hot melt adhesive composition to a temperature below the melting point of the composition, to at least partially solidify the hot melt adhesive composition. The substrate may comprise any suitable material which is to be made adhesive. Particularly desirable substrates include those suitable in forming packaging materials for packaging applications, such as food packaging. Suitable substrate materials nonexclusively include plastic films and sheets, metal sheets, lacquer coated papers, polypropylene, wood, paper, cellulosics, corrugated, cardboard, coated board, coated carton stock, composites, aluminum, glass, steel and rebar and the like. In one preferred embodiment, the substrate comprises a polyolefin film. In another preferred embodiment, the substrate comprises a metal sheet.

In a further process, the formed adhesive substrate is contacted with an article, such that the article adheres to the adhesive substrate via the hot melt adhesive composition. In certain embodiments, this process further comprises the subsequent step of bringing the hot melt adhesive composition to a temperature below the melting point of the composition. As stated above, this preferably least partially solidifies the hot melt adhesive composition. The article may comprise any suitable material which is capable of adhering to the adhesive substrate. Particularly desirable articles include those suitable for use in forming packaging materials for packaging applications, such food packaging. The article may or may not comprise substantially the same material as that used for the aforementioned adhesive substrate. Suitable article materials nonexclusively include plastic films and sheets, metal sheets, paper, corrugated board, wood, coated carton stock and the like. In one preferred embodiment, the substrate comprises a polyolefin film. In another preferred embodiment, the substrate comprises a vinyl film. In another preferred embodiment, the substrate comprises a metal sheet.

The above described processes are particularly suitable in packaging applications including food packaging applications. In one preferred embodiment a material to be packaged, such as a food product or the like, is placed between the adhesive substrate and the article. The material to be packaged is preferably placed between the adhesive substrate and the article such that, when the article adheres to the adhesive substrate via the hot melt adhesive composition, the material to be packaged is present between the adhesive substrate and the article.

In accordance with the present invention, it is preferred that the article which adheres to the adhesive substrate via the hot melt adhesive composition maintains adhesion to the adhesive substrate at elevated temperatures and/or at refrigerator and/or freezer temperatures, as described above. In one preferred embodiment, the article maintains adhesion to the adhesive substrate at temperatures of about 60° C. or above. In another preferred embodiment, the article maintains adhesion to the adhesive substrate at refrigerator or freezer temperatures, such as temperatures of about 5° C. or below. Tables 1 and 2, below, show specific data relating to adhesion properties of the inventive hot melt adhesive compositions.

The following non-limiting examples serve to illustrate the invention. It will be appreciated that variations in proportions and alternatives in elements of the components of the invention will be apparent to those skilled in the art and are within the scope of the present invention.

Example 1

Comparative

The data for Examples 1-11 correspond to trials 1-11 of Table 1, below.

An APAO hot melt adhesive composition was formed with the following formulation: 100 parts Vestoplast® 828 base polymer, 35 parts Escorez® 2596 tackifier, no wax, and no adhesion promoting additive. The resulting hot melt adhesive composition exhibited a PAFT of 116° F. (46.7° C.), and a SAFT of 241° F. (116.1° C.). This adhesive composition exhibited a lap shear strength of 98 psi to a polypropylene substrate. PAFT and SAFT test procedures were conducted using ASTM D4498 testing methods.

Example 2

An APAO hot melt adhesive composition was formed with the following formulation: 100 parts Vestoplast® 828 base polymer, 35 parts Escorez® 2596 tackifier, no wax, and 10 parts of a conventional maleated polypropylene compatibilizer. The resulting hot melt adhesive composition exhibited a PAFT of 197° F. (91.7° C.), and a SAFT of 266° F. (130° C.). This shows a significant improvement in both PAFT and SAFT over the composition of Comparative Example 1. This adhesive composition exhibited a lap shear strength of 124 psi to a polypropylene substrate, which shows an increase over Comparative Example 1.

Example 3

An APAO hot melt adhesive composition was formed with the following formulation: 100 parts Vestoplast® 828 base polymer, 35 parts Escorez® 2596 tackifier, no wax, and 10 parts of Honeywell's A-C® 596 as an adhesion promoting additive. The resulting hot melt adhesive composition exhibited a PAFT of 179° F. (81.7° C.), and a SAFT of 236° F. (113.3° C.). This shows a significant improvement in PAFT over the composition of Comparative Example 1.

The SAFT temperature in this case was the only trial where the SAFT decreased, and the decrease was so minor (~5° F.) that it is likely the result of experimental error. This adhesive composition exhibited a lap shear strength of 162 psi to a polypropylene substrate, which is a significant improvement over Comparative Example 1.

Example 4

An APAO hot melt adhesive composition was formed with the following formulation: 100 parts Vestoplast® 828 base polymer, 35 parts Escorez® 2596 tackifier, no wax, and 10 parts of Honeywell's A-C® 1325 as an adhesion promoting additive. The resulting hot melt adhesive composition exhibited a PAFT of 164° F. (73.3° C.), and a SAFT of 255° F. (123.9° C.). This shows improvements in both PAFT and SAFT over the composition of Comparative Example 1. This adhesive composition exhibited a lap shear strength of 176 psi to a polypropylene substrate, which is a significant improvement over Comparative Example 1.

Example 5

An APAO hot melt adhesive composition was formed with the following formulation: 100 parts Vestoplast® 828 base polymer, 35 parts Escorez® 2596 tackifier, no wax, and 10 parts of Honeywell's A-C® 925 as an adhesion promoting additive. The resulting hot melt adhesive composition exhibited a PAFT of 231° F. (110.6° C.), and a SAFT of 271° F. (132.2° C.). This shows a significant improvement in both PAFT and SAFT over the composition of Comparative Example 1. This adhesive composition exhibited a lap shear strength of 174 psi to a polypropylene substrate, which is a significant improvement over Comparative Example 1.

Example 6

An APAO hot melt adhesive composition was formed with the following formulation: 100 parts Vestoplast® 828 base polymer, 35 parts Escorez® 2596 tackifier, no wax, and 10 parts of Honeywell's A-C® 1172 as an adhesion promoting additive. The resulting hot melt adhesive composition exhibited a PAFT of 120° F. (48.9° C.), and a SAFT of 245° F. (118.3° C.). This shows an improvement in both PAFT and SAFT over the composition of Comparative Example 1. This adhesive composition exhibited a lap shear strength of 162 psi to a polypropylene substrate, which is a significant improvement over Comparative Example 1.

Example 7

An APAO hot melt adhesive composition was formed according to Example 2, except that instead 20 parts of the conventional maleated polypropylene compatibilizer was added. The resulting hot melt adhesive composition exhibited a PAFT of 217° F. (101.1° C.), and a SAFT of 273° F. (133.9° C.). This shows a significant improvement in PAFT and SAFT over the composition of Comparative Example 1. This adhesive composition exhibited a lap shear strength of 256 psi to a polypropylene substrate, which is a significant improvement over Comparative Example 1.

Example 8

An APAO hot melt adhesive composition was formed according to Example 3, except that instead 20 parts of Honeywell's A-C® 596 was added as the adhesion promoting additive. The resulting hot melt adhesive composition exhibited a PAFT of 206° F. (96.7° C.), and a SAFT of 249° F. (120.6° C.). This shows a significant improvement in PAFT and an increase in SAFT over the composition of Comparative Example 1. This adhesive composition exhibited a lap shear strength of 196 psi to a polypropylene substrate, which is a significant improvement over Comparative Example 1.

Example 9

An APAO hot melt adhesive composition was formed according to Example 4, except that instead 20 parts of parts of Honeywell's A-C® 1325 was added as the adhesion promoting additive. The resulting hot melt adhesive composition exhibited a PAFT of 198° F. (92.2° C.), and a SAFT of 275° F. (135° C.). This shows a significant improvement in both PAFT and SAFT over the composition of Comparative Example 1. This adhesive composition exhibited an excellent lap shear strength of 260 psi to a polypropylene substrate, which is a significant improvement over Comparative Example 1.

Example 10

An APAO hot melt adhesive composition was formed according to Example 5, except that instead 20 parts of Honeywell's A-C® 925 was added as the adhesion promoting additive. The resulting hot melt adhesive composition exhibited a PAFT of 224° F. (106.7° C.), and a SAFT of 272° F. (133.3° C.). This shows a significant improvement in both PAFT and SAFT over the composition of Comparative Example 1. This adhesive composition exhibited a lap shear strength of 244 psi to a polypropylene substrate, which is a significant improvement over Comparative Example 1.

Example 11

An APAO hot melt adhesive composition was formed according to Example 6, except that instead 20 parts of Honeywell's A-C® 1172 was added as the adhesion promoting additive. The resulting hot melt adhesive composition exhibited a PAFT of 129° F. (53.9° C.), and a SAFT of 282° F. (138.9° C.). This shows an increase in PAFT and a significant improvement in SAFT over the composition of Comparative Example 1. This adhesive composition exhibited a lap shear strength of 280 psi to a polypropylene substrate, which is a significant improvement over Comparative Example 1.

TABLE 1

| | Trial No. | | | | | | | | | | |
| --- | --- | --- | --- | --- | --- | --- | --- | --- | --- | --- | --- |
| | (Compar.) 1 | 2 | 3 | 4 | 5 | 6 | 7 | 8 | 9 | 10 | 11 |
| Additive (in wt. %): | | | | | | | | | | | |
| no additive | 0 | | | | | | | | | | |
| maleated polypropylene | | 6.9 | | | | | 12.9 | | | | |
| A-C® 596 | | | 6.9 | | | | | 12.9 | | | |
| A-C® 1325 | | | | 6.9 | | | | | 12.9 | | |
| A-C® 925 | | | | | 6.9 | | | | | 12.9 | |
| A-C® 1172 | | | | | | 6.9 | | | | | 12.9 |
| Base Polymer (Vestoplast® 828) | 74.1 | 69 | 69 | 69 | 69 | 69 | 64.5 | 64.5 | 64.5 | 64.5 | 64.5 |
| Tackifier (Escorez® 2596) | 25.9 | 24.1 | 24.1 | 24.1 | 24.1 | 24.1 | 22.6 | 22.6 | 22.6 | 22.6 | 22.6 |
| Adhesion (psi) | | | | | | | | | | | |
| PP Lap Shear | 98 | 124 | 162 | 176 | 174 | 162 | 256 | 196 | 260 | 244 | 280 |
| SD +/− | 10 | 9.8 | 12.8 | 10.4 | 12.4 | 18.8 | 25.6 | 26.4 | 14 | 32.8 | 12.4 |
| Heat Resistance (° F.) | | | | | | | | | | | |
| PAFT | 116 | 197 | 179 | 164 | 231 | 120 | 214 | 206 | 198 | 224 | 129 |
| SAFT | 241 | 266 | 236 | 255 | 271 | 245 | 273 | 249 | 275 | 272 | 282 |

Example 12

Comparative

The data for Examples 12-23 correspond to trials 1-13 of Table 2, below.

A mEO hot melt adhesive composition was formed with the following formulation: 40 wt % of Affinity® GA-1900 base polymer, 30 wt % of Escorez® 5637 tackifier, 30 wt % of Sasol® H-1 wax, and no adhesion promoting additive. The resulting hot melt adhesive composition exhibited an adhesion level (in % fiber tear) of 0% at 0° F. (−17.8° C.) for inland board stock, and 0% at 35° F. (1.7° C.) for a bacon carton.

Example 13

A mEO hot melt adhesive composition was formed with the following formulation: 40 wt % of Affinity® GA-1950 base polymer, 30 wt % of Escorez® 5637 tackifier, 25 wt % of Sasol® H-1 wax, and 5 wt % of a conventional maleated polypropylene compatibilizer. The resulting hot melt adhesive composition exhibited an adhesion level (in % fiber tear) of 50% at 0° F. (−17.8° C.) for inland board stock, which is a significant improvement in low-temperature adhesion at freezer temperatures over Comparative Example 12. In addition, an adhesion level of 100% at 35° F. (1.7° C.) was shown for a bacon carton. This is also a significant improvement in low-temperature adhesion at refrigerator temperatures over the composition of Comparative Example 12.

Example 14

A mEO hot melt adhesive composition was formed with the following formulation: 40 wt % of Affinity® GA-1950 base polymer, 30 wt % of Escorez® 5637 tackifier, 25 wt % of Sasol® H-1 wax, and 5 wt % of Honeywell's A-C® 596 as an adhesion promoting additive. The resulting hot melt adhesive composition exhibited an adhesion level (in % fiber tear) of 50% at 0° F. (−17.8° C.) for inland board stock, which is a significant improvement in low-temperature adhesion at freezer temperatures over Comparative Example 12. In addition, an adhesion level of 100% at 35° F. (1.7° C.) was shown for a bacon carton. This is also a significant improvement in low-temperature adhesion at refrigerator temperatures over the composition of Comparative Example 12.

Example 15

A mEO hot melt adhesive composition was formed with the following formulation: 40 wt % of Affinity® GA-1950 base polymer, 30 wt % of Escorez® 5637 tackifier, 25 wt % of Sasol® H-1 wax, and 5 wt % of Honeywell's A-C® 1325 as an adhesion promoting additive. The resulting hot melt adhesive composition exhibited an adhesion level (in % fiber tear) of 50% at 0° F. (−17.8° C.) for inland board stock, which is a significant improvement in low-temperature adhesion at freezer temperatures over Comparative Example 12. In addition, an adhesion level of 100% at 35° F. (1.7° C.) was shown for a bacon carton. This is also a significant improvement in low-temperature adhesion at refrigerator temperatures over the composition of Comparative Example 12.

Example 16

A mEO hot melt adhesive composition was formed with the following formulation: 40 wt % of Affinity® GA-1950 base polymer, 30 wt % of Escorez® 5637 tackifier, 25 wt % of Sasol® H-1 wax, and 5 wt % of Honeywell's A-C® 925 as an adhesion promoting additive. The resulting hot melt adhesive composition exhibited an adhesion level (in % fiber tear) of 100% at 0° F. (−17.8° C.) for inland board stock, which is a significant improvement in low-temperature adhesion at freezer temperatures over Comparative Example 12. In addition, an adhesion level of 100% at 35° F. (1.7° C.) was shown for a bacon carton. This is also a significant improvement in low-temperature adhesion at refrigerator temperatures over the composition of Comparative Example 12.

Example 17

A mEO hot melt adhesive composition was formed with the following formulation: 40 wt % of Affinity® GA-1950 base polymer, 30 wt % of Escorez® 5637 tackifier, 25 wt % of Sasol® H-1 wax, and 5 wt % of Honeywell's A-C® 1172 as an adhesion promoting additive. The resulting hot melt adhesive composition exhibited an adhesion level (in % fiber tear) of 100% at 0° F. (−17.8° C.) for inland board stock, which is a significant improvement in low-temperature adhesion at freezer temperatures over Comparative Example 12. In addition, an adhesion level of 50% at 35° F. (1.7° C.) was shown for a bacon carton. This is also a significant improvement in low-temperature adhesion at refrigerator temperatures over the composition of Comparative Example 12.

Example 18

A mEO hot melt adhesive composition was formed with the following formulation: 40 wt % of Affinity® GA-1950 base polymer, 30 wt % of Escorez® 5637 tackifier, 25 wt % of Sasol® H-1 wax, and 5 wt % of Honeywell's A-C® 573 as an adhesion promoting additive. The resulting hot melt adhesive composition exhibited an adhesion level (in % fiber tear) of 50% at 0° F. (−17.8° C.) for inland board stock, which is a significant improvement in low-temperature adhesion at freezer temperatures over Comparative Example 12. In addition, an adhesion level of 100% at 35° F. (1.7° C.) was shown for a bacon carton. This is also a significant improvement in low-temperature adhesion at refrigerator temperatures over the composition of Comparative Example 12.

Example 19

A mEO hot melt adhesive composition was formed according to Example 13 except that instead 10 wt % of the conventional maleated polypropylene compatibilizer was added to the composition. The resulting hot melt adhesive composition exhibited an adhesion level (in % fiber tear) of 20% at 0° F. (−17.8° C.) for inland board stock, which showed an improvement in low-temperature adhesion at freezer temperatures over Comparative Example 12. In addition, an adhesion level of 100% at 35° F. (1.7° C.) was shown for a bacon carton. This also a significant improvement in low-temperature adhesion at refrigerator temperatures over the composition of Comparative Example 12.

Example 20

A mEO hot melt adhesive composition was formed according to Example 14 except that instead 10 wt % of Honeywell's A-C® 596 was added to the composition. The resulting hot melt adhesive composition exhibited an adhesion level (in % fiber tear) of 50% at 0° F. (−17.8° C.) for inland board stock, which is a significant improvement in low-temperature adhesion at freezer temperatures over Comparative Example 12. In addition, an adhesion level of 25% at 35° F. (1.7° C.) was shown for a bacon carton. This is an improvement in low-temperature adhesion at refrigerator temperatures over the composition of Comparative Example 12.

Example 21

A mEO hot melt adhesive composition was formed according to Example 15 except that instead 10 wt % of Honeywell's A-C® 1325 was added to the composition. The resulting hot melt adhesive composition exhibited an adhesion level (in % fiber tear) of 100% at 0° F. (−17.8° C.) for inland board stock, which is a significant improvement in low-temperature adhesion at freezer temperatures over Comparative Example 12. In addition, an adhesion level of 50% at 35° F. (1.7° C.) was shown for a bacon carton. This is also a significant improvement in low-temperature adhesion at refrigerator temperatures over the composition of Comparative Example 12.

Example 22

A mEO hot melt adhesive composition was formed according to Example 16 except that instead 10 wt % of Honeywell's A-C® 925 was added to the composition. The resulting hot melt adhesive composition exhibited an adhesion level (in % fiber tear) of 100% at 0° F. (−17.8° C.) for inland board stock, which is a significant improvement in low-temperature adhesion at freezer temperatures over Comparative Example 12. In addition, an adhesion level of 100% at 35° F. (1.7° C.) was shown for a bacon carton. This is also a significant improvement in low-temperature adhesion at refrigerator temperatures over the composition of Comparative Example 12.

Example 23

A mEO hot melt adhesive composition was formed according to Example 17 except that instead 10 wt % of Honeywell's A-C® 1172 was added to the composition. The resulting hot melt adhesive composition exhibited an adhesion level (in % fiber tear) of 100% at 0° F. (−17.8° C.) for inland board stock, which is a significant improvement in low-temperature adhesion at freezer temperatures over Comparative Example 12. In addition, an adhesion level of 100% at 35° F. (1.7° C.) was shown for a bacon carton. This is also a significant improvement in low-temperature adhesion at refrigerator temperatures over the composition of Comparative Example 12.

Example 24

A mEO hot melt adhesive composition was formed according to Example 18 except that instead 10 wt % of Honeywell's A-C® 573 was added to the composition. The resulting hot melt adhesive composition exhibited an adhesion level (in % fiber tear) of 100% at 0° F. (−17.8° C.) for inland board stock, which is a significant improvement in low-temperature adhesion at freezer temperatures over Comparative Example 12. In addition, an adhesion level of 100% at 35° F. (1.7° C.) was shown for a bacon carton. This is also a significant improvement in low-temperature adhesion at refrigerator temperatures over the composition of Comparative Example 12.

TABLE 2

| | Trial No. | | | | | | | | | | | | |
|---|---|---|---|---|---|---|---|---|---|---|---|---|---|
| | (Compar.) 1 | 2 | 3 | 4 | 5 | 6 | 7 | 8 | 9 | 10 | 11 | 12 | 13 |
| Additive (in wt. %): | | | | | | | | | | | | | |
| no additive | 0 | | | | | | | | | | | | |
| maleated polypropylene | | 5 | | | | | | 10 | | | | | |
| A-C ® 596 | | | 5 | | | | | | 10 | | | | |
| A-C ® 1325 | | | | 5 | | | | | | 10 | | | |
| A-C ® 925 | | | | | 5 | | | | | | 10 | | |
| A-C ® 1172 | | | | | | 5 | | | | | | 10 | |
| A-C ® 573 | | | | | | | 5 | | | | | | 10 |
| Wax (Sasol ® H-1) | 30 | 25 | 25 | 25 | 25 | 25 | 25 | 20 | 20 | 20 | 20 | 20 | 20 |
| Tackifier (Escorez ® 5637) | 30 | 30 | 30 | 30 | 30 | 30 | 30 | 30 | 30 | 30 | 30 | 30 | 30 |
| Base Polymer (Affinity ® GA-1950) | 40 | 40 | 40 | 40 | 40 | 40 | 40 | 40 | 40 | 40 | 40 | 40 | 40 |
| Adhesion (% fiber tear) Inland Board Stock | | | | | | | | | | | | | |
| 0° F. (−17.8° C.) | 0% | 50% | 50% | 50% | 100% | 100% | 50% | 20% | 50% | 100% | 100% | 100% | 100% |
| 35° F. (1.7° C.) | 100% | 100% | 100% | 100% | 100% | 100% | 100% | 100% | 100% | 100% | 100% | 100% | 100% |
| Bacon carton | | | | | | | | | | | | | |
| 35° F. (1.7° C.) | 0% | 100% | 100% | 100% | 100% | 50% | 100% | 100% | 25% | 50% | 100% | 100% | 100% |

EXAMPLES 25-37

Comparative

The data for Examples 25-37 correspond to trials 1-13 of Table 3, below.

The procedures of Examples 12-24 were repeated using an ethylene vinyl acetate (EVA) base polymer (28VA-200MI), and except that Examples 15 and 20 were conducted with Honeywell's A-C® 415 as the adhesion promoting additive rather than A-C® 573. Results from Examples 25-37 were poor as compared to Examples 12-24, particularly where adhesion to the bacon package at 35° F. remained at 0% for all trials. Further, six out of 12 trials remained at 0% for the board stock at 0° C. These results show that the improvements exhibited in Examples 12-24 were unexpected and dramatic.

TABLE 3

| | Trial No. | | | | | | | | | | | | |
|---|---|---|---|---|---|---|---|---|---|---|---|---|---|
| | (Compar.) 1 | 2 | 3 | 4 | 5 | 6 | 7 | 8 | 9 | 10 | 11 | 12 | 13 |
| Additive (in wt. %): | | | | | | | | | | | | | |
| no additive | 0 | | | | | | | | | | | | |
| maleated polypropylene | | 5 | | | | | | 10 | | | | | |

TABLE 3-continued

| | (Compar.) 1 | 2 | 3 | 4 | 5 | 6 | 7 | 8 | 9 | 10 | 11 | 12 | 13 |
|---|---|---|---|---|---|---|---|---|---|---|---|---|---|
| A-C ® 596 | | | 5 | | | | | | 10 | | | | |
| A-C ® 1325 | | | | 5 | | | | | | 10 | | | |
| A-C ® 925 | | | | | 5 | | | | | | 10 | | |
| A-C ® 1172 | | | | | | 5 | | | | | | 10 | |
| A-C ® 415 | | | | | | | 5 | | | | | | 10 |
| Wax (Sasol ® H-1) | 30 | 25 | 25 | 25 | 25 | 25 | 25 | 20 | 20 | 20 | 20 | 20 | 20 |
| Tackifier (Escorez ® 5637) | 30 | 30 | 30 | 30 | 30 | 30 | 30 | 30 | 30 | 30 | 30 | 30 | 30 |
| Base Polymer (28VA, 400MI) | 40 | 40 | 40 | 40 | 40 | 40 | 40 | 40 | 40 | 40 | 40 | 40 | 40 |
| Adhesion (% fiber tear) Inland Board Stock | | | | | | | | | | | | | |
| 0° F. (−17.8° C.) | 0% | 50% | 50% | 0% | 0% | 0% | 0% | 100% | 50% | 50% | 0% | 100% | 0% |
| 35° F. (1.7° C.) | 100% | 100% | 100% | 100% | 100% | 100% | 100% | 100% | 100% | 100% | 100% | 100% | 100% |
| Bacon carton | | | | | | | | | | | | | |
| 35° F. (1.7° C.) | 0% | 0% | 0% | 0% | 0% | 0% | 0% | 0% | 0% | 0% | 0% | 0% | 0% |

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A hot melt adhesive composition which comprises:
   a) a base polymer comprising at least one metallocene ethylene-containing polymer or at least one non-metallocene, amorphous, propylene containing polymer wherein the metallocene ethylene-containing polymer comprises at least one polymer selected from the group consisting of a metallocene ethylene-octene polymer, a metallocene ethylene-butene polymer, and a metallocene ethylene-hexene copolymer; and wherein the non-metallocene, amorphous, propylene containing polymer comprises at least one polymer selected from the group consisting of a non-metallocene amorphous propylene-butene copolymer, a non-metallocene amorphous propylene-ethylene copolymer, and a non-metallocene amorphous propylene-butene-ethylene terpolymer, wherein the base polymer is provided in an amount of from about 20% to about 80% by weight of the hot melt adhesive composition;
   b) a tackifier which comprises an aliphatic or aromatic modified cycloaliphatic hydrocarbon resin or a polyterpene, wherein the tackifier is provided in an amount of from about 15% to about 70% by weight of the hot melt adhesive composition;
   c) an optional wax; and
   d) an adhesion promoting additive provided in an amount of from about 1% to about 17% by weight of the hot melt adhesive composition comprising at least one semi-crystalline polymer having an average weight average molecular weight of about 30,000 daltons or less and, which is selected from the group consisting of a polypropylene polymer, a maleated polypropylene polymer, a maleated polyethylene polymer, and copolymers thereof wherein the hot melt adhesive composition demonstrates improved adhesiveness to a substrate at temperatures of greater than or equal to 60° C., as compared to a composition lacking the adhesion promoting additive, when the base polymer includes at least one non-metallocene, amorphous, propylene containing polymer, and the hot melt adhesive composition demonstrates improved adhesiveness to a substrate at temperatures of less than or equal to 5° C., as compared to a composition lacking the adhesion promoting additive, when the base polymer includes at least one metallocene ethylene-containing polymer.

2. The composition of claim 1 wherein the adhesion promoting additive comprises a maleated polymer having a percent bound of about 50% or greater.

3. The composition of claim 1 wherein the adhesion promoting additive has a Mettler drop point of from about 100° C. to about 170° C.

4. The composition of claim 1 wherein the adhesion promoting additive has a viscosity, based on Brookfield viscometer measurement at 190° C., of from about 100 cps to about 5000 cps.

5. The composition of claim 1 wherein the metallocene ethylene-containing polymer has a melt index of from about 5 to about 3000.

6. The composition of claim 5 wherein the metallocene ethylene-containing polymer has a melt index of from about 200 to about 2000.

7. The composition of claim 6 wherein the metallocene ethylene-containing polymer has a melt index of from about 400 to about 1200.

8. The composition of claim 1 wherein the metallocene ethylene-containing polymer has a specific gravity of about 0.90 or below.

9. The composition of claim 1 wherein the base polymer comprises at least one metallocene-ethylene containing polymer, and wherein the optional wax is present.

10. The composition of claim 1 wherein the base polymer comprises at least one non-metallocene amorphous propylene containing polymer, and wherein the optional wax is not present.

11. The composition of claim 1 wherein the base polymer comprises a metallocene ethylene-octene copolymer.

12. The composition of claim 1 wherein the base polymer comprises a metallocene ethylene-hexene copolymer.

13. The composition of claim 1 wherein the base polymer comprises a non-metallocene amorphous poly-alpha-olefin.

14. A process for forming a hot melt adhesive composition which comprises combining:
  a) a base polymer comprising at least one metallocene ethylene-containing polymer or at least one non-metallocene, amorphous, propylene containing polymer wherein the metallocene ethylene-containing polymer comprises at least one polymer selected from the group consisting of a metallocene ethylene-octene polymer, a metallocene ethylene-butene polymer, and a metallocene ethylene-hexene copolymer; and wherein the non-metallocene, amorphous, propylene containing polymer comprises at least one polymer selected from the group consisting of a non-metallocene amorphous propylene-butene copolymer, a non-metallocene amorphous propylene-ethylene copolymer, and a non-metallocene amorphous propylene-butene-ethylene terpolymer, wherein the base polymer is provided in an amount of from about 20% to about 80% by weight of the hot melt adhesive composition;
  b) a tackifier which comprises an aliphatic or aromatic modified cycloaliphatic hydrocarbon resin or a polyterpene, wherein the tackifier is provided in an amount of from about 15% to about 70% by weight of the hot melt adhesive composition;
  c) an optional wax; and
  d) an adhesion promoting additive provided in an amount of from about 1% to about 17% by weight of the hot melt adhesive composition comprising at least one semi-crystalline polymer having an average weight average molecular weight of about 30,000 daltons or less and, which is selected from the group consisting of a polypropylene polymer, a maleated polypropylene polymer, a maleated polyethylene polymer, and copolymers thereof wherein the hot melt adhesive composition demonstrates improved adhesiveness to a substrate at temperatures of greater than or equal to 60° C., as compared to a composition lacking the adhesion promoting additive, when the base polymer includes at least one non-metallocene, amorphous, propylene containing polymer, and the hot melt adhesive composition demonstrates improved adhesiveness to a substrate at temperatures of less than or equal to 5° C., as compared to a composition lacking the adhesion promoting additive, when the base polymer includes at least one metallocene ethylene-containing polymer.

15. The process of claim 14 wherein said combining comprises forming a substantially homogeneous admixture of components (a)-(d).

16. The process of claim 14 wherein said combining comprises extruding components (a)-(d).

17. The composition of claim 1 wherein the hot melt adhesive composition exhibits an increase in percent fiber tear of over 50%, as compared to a hot melt adhesive composition not including an adhesion promoting additive.

18. The composition of claim 1 wherein the hot melt adhesive composition exhibits an increase in at least one of PAFT, SAFT, and lap shear, as compared to a hot melt adhesive composition not including an adhesion promoting additive.

19. The composition of claim 1 wherein the at least one semi-crystalline polymer has a weight average molecular weight of between about 8,000 daltons to about 25,000 daltons.

20. The composition of claim 1 wherein the at least one semi-crystalline polymer having a weight average molecular weight of between about 12,000 daltons to about 22,000 daltons.

21. The composition of claim 1 wherein the at least one semi-crystalline polymer has a weight average molecular weight of between about 2,000 daltons to about 16,000 daltons.

22. The composition of claim 1 wherein the tackifier is provided in an amount between about 20 wt % and about 40 wt % of the hot melt adhesive composition.

* * * * *